US008380397B2

(12) United States Patent
Foster et al.

(10) Patent No.: US 8,380,397 B2
(45) Date of Patent: Feb. 19, 2013

(54) OFF-ROAD VEHICLE WITH REDUNDANT NON-CONTACT MULTI-REVOLUTION ANGLE SENSOR

(75) Inventors: Christopher A. Foster, Denver, PA (US); Richard P. Strosser, Akron, PA (US)

(73) Assignee: CNH America LLC, New Holland, PA (US)

( * ) Notice: Subject to any disclaimer, the term of this patent is extended or adjusted under 35 U.S.C. 154(b) by 494 days.

(21) Appl. No.: 12/487,930

(22) Filed: Jun. 19, 2009

(65) Prior Publication Data

US 2010/0324778 A1    Dec. 23, 2010

(51) Int. Cl.
*B62D 6/00*    (2006.01)
*G01M 17/00*    (2006.01)
*G06F 7/00*    (2006.01)

(52) U.S. Cl. .......... 701/41; 701/50; 701/30.6; 701/30.8; 180/402

(58) Field of Classification Search ........................ None
See application file for complete search history.

(56) References Cited

U.S. PATENT DOCUMENTS

| | | |
|---|---|---|
| 3,777,273 A | 12/1973 | Baba et al. |
| 3,939,372 A | 2/1976 | Wurst et al. |
| 4,570,118 A | 2/1986 | Tomczak et al. |
| 4,573,348 A * | 3/1986 | Abramson et al. ......... 73/115.02 |
| 4,719,419 A | 1/1988 | Dawley |
| 4,746,859 A | 5/1988 | Malik |
| 4,942,394 A | 7/1990 | Gasiunas |
| 4,955,228 A | 9/1990 | Hirose et al. |
| 5,027,648 A | 7/1991 | Filleau et al. |
| 5,057,684 A | 10/1991 | Service |
| 5,708,496 A | 1/1998 | Barnett et al. |
| 6,124,709 A | 9/2000 | Allwine |

(Continued)

FOREIGN PATENT DOCUMENTS

| | | |
|---|---|---|
| DE | 9115952 | 4/1993 |
| DE | 19712869 | 10/1998 |

(Continued)

OTHER PUBLICATIONS

U.S. Appl. No. 11/446,882, filed Dec. 6, 2007, Strosser et al.
EP2278278, European Search Opinion and Applicant Response, Dec. 23, 2010, Jul. 26, 2011.

*Primary Examiner* — Michael J. Zanelli
(74) *Attorney, Agent, or Firm* — Patrick M. Sheldrake (57) ABSTRACT

An off-road work vehicle has a steer-by-wire steering system having a device for determining the angular displacement of a steering wheel. The device has a cam configured to rotate about an axis at an identical angular speed as the steering wheel, a first sensor proximal to a facing outer surface of the cam and being configured to determine a distance between the first sensor and the facing outer surface of the cam, a second sensor proximal to a facing outer surface of the cam and being configured to determine a distance between the second sensor and the facing outer surface of the cam, and a processor operably connected with the first and second sensors and configured to determine an angular position of the steering wheel and a direction of rotation of the steering wheel based upon data generated by the first and/or the second sensor. The distance between each of the first and second sensors and the facing outer surface of the cam changes gradually over a first major portion of the facing outer surface and sharply over a second, minor portion of the facing outer surface. The two sensors are redundant to one another and help maintain the robustness of the system.

19 Claims, 6 Drawing Sheets

U.S. PATENT DOCUMENTS

| | | |
|---|---|---|
| 6,367,337 B1 | 4/2002 | Schlabach |
| 6,502,661 B1 * | 1/2003 | Heitzer .................. 180/403 |
| 6,622,391 B1 | 9/2003 | Shirai et al. |
| 2002/0101595 A1 * | 8/2002 | Johnson .................. 356/602 |
| 2007/0216403 A1 | 9/2007 | Asano |

FOREIGN PATENT DOCUMENTS

| | | |
|---|---|---|
| DE | 202005012194 | 12/2005 |
| WO | WO 95/08751 * | 3/1995 |
| WO | WO0242713 A2 | 5/2002 |

* cited by examiner

$T_{zero}$  $T_{b1}$ $T_{a1}$  $T_{b2}$ $T_{a2}$

*FIG. 8*

$T_{zero}$ $T_{c1}$ $T_{b1}$ $T_{a1}$  $T_{c2}$ $T_{b2}$ $T_{a2}$

OFF-ROAD VEHICLE WITH REDUNDANT NON-CONTACT MULTI-REVOLUTION ANGLE SENSOR

BACKGROUND OF THE INVENTION

Steer-by-wire systems are increasing in popularity, including in work vehicles such as construction vehicles and farm vehicles. In a steer-by-wire system, the connection between the steering wheel and the wheels and other parts of the steering mechanism is electronic, rather than mechanical. Thus, in order to have a steer-by-wire system, it is necessary to be able to measure the angular displacement of a steering wheel so that the vehicle can turn based upon this displacement since there is no mechanical transmission of the angular displacement of the steering wheel to the vehicle's steering mechanism.

Traditional angular measurement devices have included optical encoders which detect angular displacement based upon a detection of light transmission and/or blockage through a rotating object. Examples of such devices include various disc-shaped objects, such as the following: a circular disc having a thicker ring surrounding a thinner web with holes through the ring; a flat disc with holes proximate a circumferential edge of the disc; a flat piece of glass with scratches etched on its surface to break up the passage of light through the disc, etc. In such configurations, light passes through the holes (or is blocked by the etches) and the angular measurement is determined based upon how frequently light passes through the holes or is blocked by etches in a circumferential position around the disc-shaped object.

However, such system does not permit a determination of direction of rotation since it merely measures frequency of detection of light passing through the holes or apertures (or blockage of light by etches) in the disc-shaped object. Thus, a second sensor in quadrature to the first sensor is provided to determine direction of rotation. Being in quadrature means that they are out of phase 90 degrees. Thus, comparing the outputs of the sensors as a function of time will provide information as to which direction the disc-shaped object is moving since the sensors are fixed at a 90 degree phase shift.

The problems of using typical disc-shaped objects include that the additional sensor in quadrature is needed to determine the direction of motion, as explained above, and also that the disc-shaped objects are not very robust. For example, a slotted disc may be used, and it may be made thin to keep the sensor package as small as possible, which makes it more fragile. These sensor discs can be made from glass, plastic, and sometimes metal. The slots in the disc act as stress concentrators when under load and when heavy shock or vibration loads are applied to the sensor package, which can often lead to failures of the disc itself by causing, for example, cracks, pieces breaking off, etc. As the angular resolution of an encoder using one of these disc-shaped objects is increased by increasing the number of slots around the circumference, the disc becomes even more delicate. In situations where a piece of equipment is used in construction or farming, there are stresses created and other environmental exposures that can damage disc-shaped objects. For example, heavy shock loads and vibration are a problem which can adversely affect disc-shaped objects. The present invention addresses these problems as well as having other advantages, as explained more fully below, with the use of sensors to measure the distance to a cam to determine angular displacement. The present invention can include a cam made from a solid piece of metal or plastic and can easily be designed with minimal stress concentrations which will make the cam itself far more robust to heavy shock and vibration loads than traditional disc-shaped objects.

U.S. Pat. No. 4,942,394 is directed to a Hall Effect Encoder Apparatus. This patent has the sensor on the inside of a rotating shaft rather than on an outside. Thus, the sensor itself is what is moving rather than measuring the movement of a cam. Moreover, the invention is not directed to vehicles.

U.S. patent application Ser. No. 11/446,882 (Published as US 2007/0282507) is directed to Non-Contact Neutral Sensing with Direction Feedback. Here, there is no steer-by-wire system. Furthermore, there is no redundancy. Also, the rotation of a cam with sensors around it does not occur over 360 degrees. The disclosure of this patent application is incorporated by reference herein in its entirety.

BRIEF SUMMARY OF THE INVENTION

A first aspect of the present invention is an off-road work vehicle with a steer-by-wire steering system comprising a device for determining the angular displacement of a steering wheel. The device has a cam configured to rotate about an axis at an identical angular speed as the steering wheel, a first sensor proximal to a facing outer surface of the cam and being configured to determine a distance between the first sensor and the facing outer surface of the cam, a second sensor proximal to a facing outer surface of the cam and being configured to determine a distance between the second sensor and the facing outer surface of the cam, and a processor operably connected with the first and second sensors and configured to determine an angular position of the steering wheel and a direction of rotation of the steering wheel based upon data generated by the first and/or second sensors. The distance between each of the first and second sensors and the facing outer surface of the cam changes gradually over a first major portion of the facing outer surface and sharply over a second, minor portion of the facing outer surface.

Another aspect of the present invention is a device for determining the angular displacement of a rotating object, comprising a cam configured to rotate about an axis at an identical angular speed as the object, a first sensor proximal to a facing outer surface of the cam and being configured to determine a distance between the first sensor and the facing outer surface of the cam, a second sensor proximal to the facing outer surface of the cam and being configured to determine a distance between the second sensor and the facing outer surface of the cam, and a processor operably connected with the first and second sensors and configured to determine an angular position of the object and a direction of rotation of the object based upon data generated by the first and/or second sensors. The distance between the facing outer surface of the cam and each of the first and second sensors gradually decreases in a first rotational direction over a first portion of the outer surface and sharply increases in the first rotational direction over a second portion of the outer surface.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
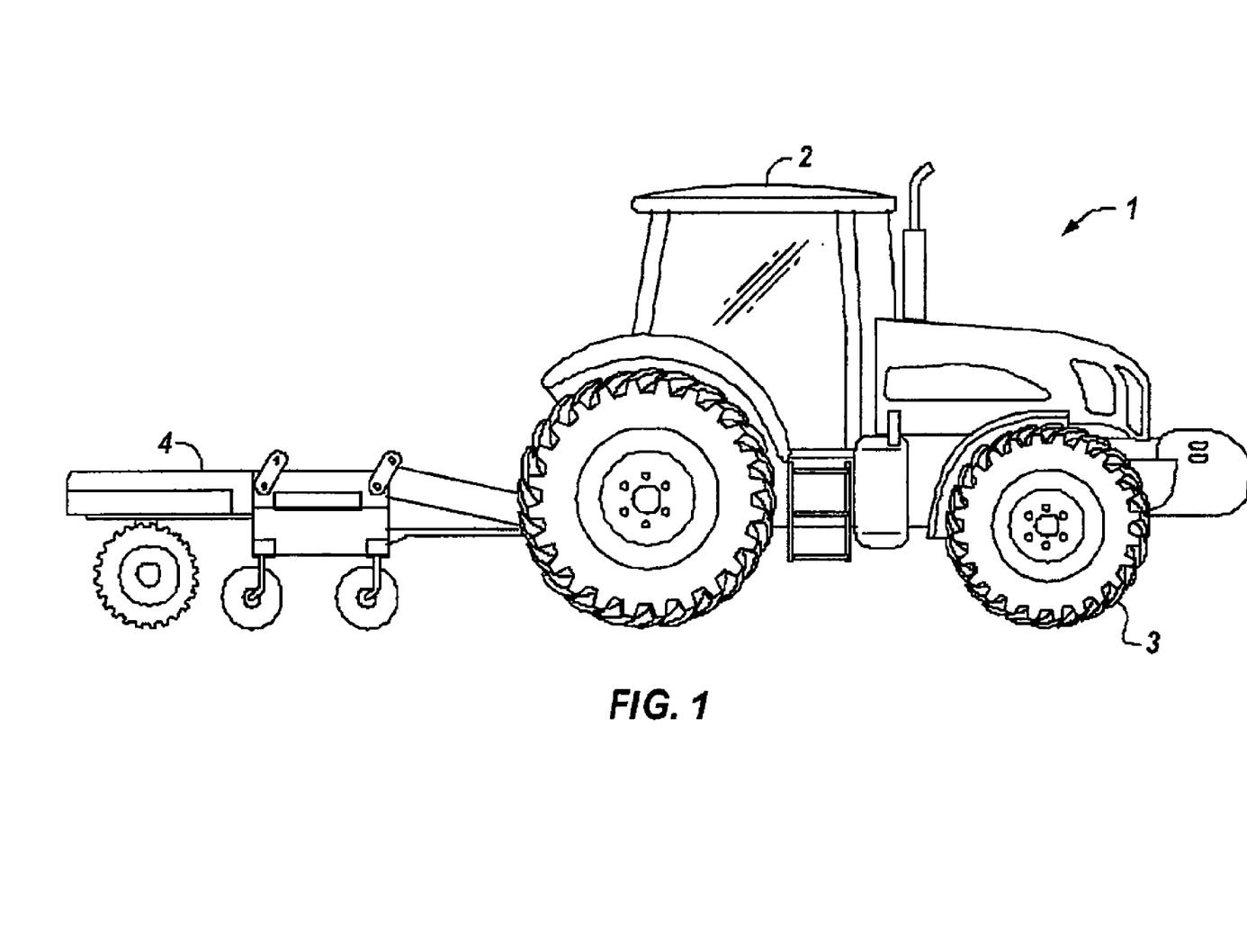
FIG. 1 is a schematic side view of an off-road vehicle.

An off-road vehicle 1 is shown in FIG. 1, including a cab 2, tires 3, and a plow 4. The off-road vehicle according to the present invention is not limited to this configuration and can have any configuration and be any motorized farm vehicle or construction vehicle.

Figure 2:
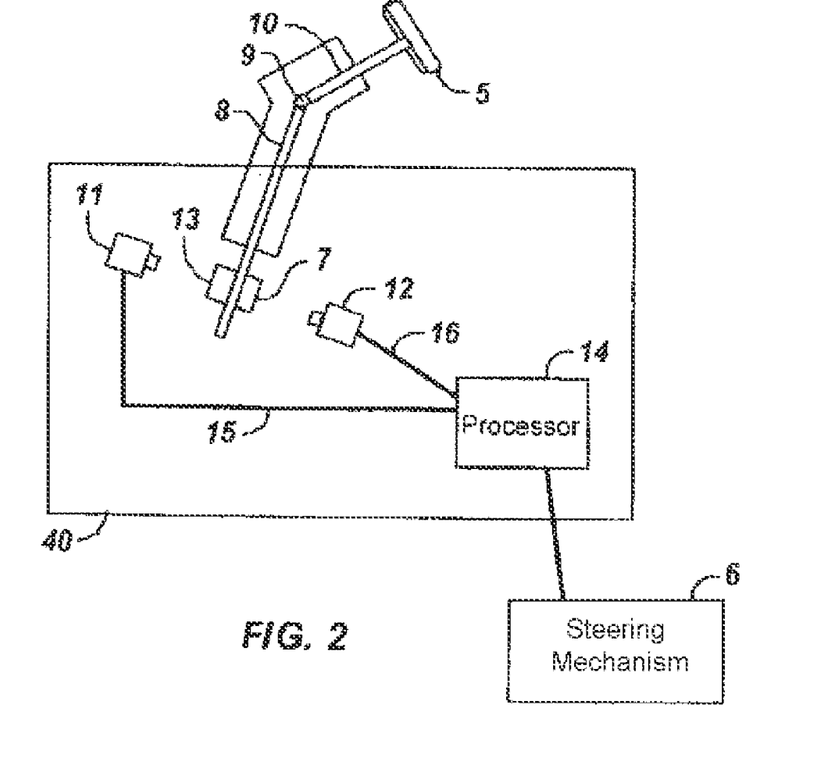
FIG. 2 is a schematic side view of a system for measuring the angular displacement and direction of rotation of a steering wheel.

The off-road vehicle has a steer-by-wire steering system, which is shown in FIG. 2. Thus, there is no mechanical communication between a steering wheel 5 and a steering mechanism 6 since the communication is electronic. The steering mechanism can include any type of steering system, including axle steering (used in, e.g., typical tractors and combines), differential steering (used in, e.g., bulldozers, skid steer loaders, SP windrowers, etc.), and pivot/articulated steering (used in, e.g., wheel loaders, large 4-WD tractors, etc.). The off-road vehicle includes a device 40 for determining the angular displacement of the steering wheel 5. The device 40 comprises a cam 7 configured to rotate about an axis at an identical angular speed as the steering wheel 5.

In the particular case of FIG. 2, a shaft 8 is shown mechanically connected to the steering wheel 5 by a universal connector 9 and another shaft 10. The device 40 also includes a first sensor 11 proximal to a facing outer surface 13 of the cam 7 and being configured to determine a distance between the first sensor 11 and the facing outer surface 13 of the cam 7. The device 40 also includes a second sensor 12 proximal to a facing outer surface 13 of the cam 7 and being configured to determine a distance between the second sensor 12 and the facing outer surface 13 of the cam 7. The device 40 also includes a processor 14 operably connected with the first and second sensors 11, 12 via electronic connections 15 and 16 (also referred to as "channels") and configured to determine an angular position of the steering wheel and a direction of rotation of the steering wheel based upon data generated by the first and/or the second sensors 11, 12. FIG. 2 does not show what sensors 11, 12 are attached to as a supporting structure. As long as they are at a fixed position relative to the axis of the cam 7 and one another, it does not matter where or how they are supported. One option would be for sensors 11, 12 to be supported on a bracket fixed to the frame of a steering column. Other options are also possible. Additionally, the determination of distance by the sensors 11, 12 can be done by optical sensing or ultrasonic sensing. However, other methods are acceptable, such as Hall effect or other magnetic based sensing, inductive based sensing, and eddy current based sensing with appropriate sensors. The sensors preferably have analog outputs.

Figure 3:
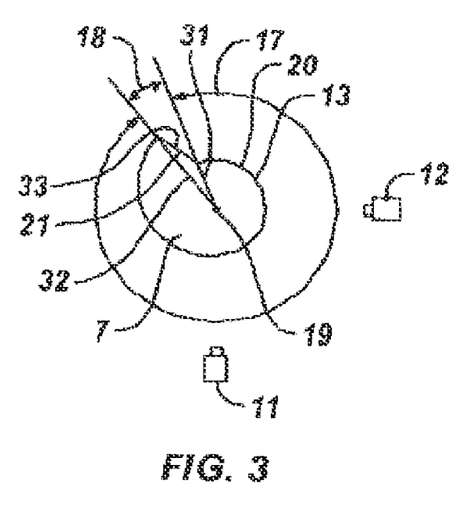
FIG. 3 is a schematic plan view of a cam and two sensors used to measure the angular displacement and direction of rotation of the cam.

As shown in FIG. 3, the distance between each of the first and second sensors 11, 12 and the facing outer surface 13 of the cam 7 changes gradually in a radial direction of the cam 7 over a first major portion 20 of the facing outer surface 13 and sharply over a second, minor portion 21 of the facing outer surface. The first major portion 20 and the second minor portion 21 are defined by arcs 17 and 18, respectively (major portion 20 and minor portion 21 are the projections of arcs 17 and 18 on the facing outer surface 13). Thus, as shown in FIG. 3, the distance between the facing outer surface 13 of the cam 7 and the first and second sensors 11, 12 varies as the cam 7 rotates. This variation, which is detected by the first and second sensors 11, 12 is communicated to the processor 14, which uses this information to determine the angular displacement of the cam 7. For example, depending on the profile of the cam 7, which is known in advance, and the information of which is incorporated into the processing of the processor, the processor 14 can determine the angular position of the cam 7 and the direction of rotation since the profile of the cam 7 and the position of sensors 11, 12 is known. The angular rate of change of the profile of the cam is preferably linear such that the sensor output is linear for rotation of the cam at a constant angular rate. However, it could be designed to be non-linear, if desired. If the processor 14 were to create a plot of the distance between a sensor and the cam 7 versus time, the magnitude of the slope would show the speed and whether the slope is negative or positive would show the direction of rotation. The distance to a sensor at a particular point in time will correspond to a particular angular position of the cam 7 at that point in time.

In FIG. 3, for example, if the cam is rotating counter-clockwise, any of first or second sensors 11,12 which faces the first major portion 20 of cam 7, will detect a decreasing distance between the sensor and the cam outer surface 13 since the shape of the cam 7 is such that it will extend outward relative to the axis 19. The processor will have stored information corresponding to the shape of the cam and will be able to determine that the cam is rotating in a particular direction and will be able to determine the angular position of the cam 7. If, in contrast, the rotation of the cam were clockwise, the distance between any of first or second sensors 11, 12 which faces the first major portion of cam 7 will increase since the shape of the cam 7 is such that it will move towards the axis 19 at the points where it faces the first or second sensor 11, 12. Thus, the direction can be determined by the processor 14 depending on whether the distance to sensor 11 and/or 12 is increasing or decreasing. Furthermore, the angular position can also be determined by the actual distance itself. As stated above, information regarding the shape of cam 7 is included in the processor 14 and, therefore, a particular distance between the outer surface 13 of the cam 7 translates to a particular angular position of the cam 7 and this is determined by the processor 14 based on predetermined information contained in or accessible to processor 14 regarding the shape of the cam 7.

The embodiment shown in FIG. 3 includes the cam 7 rotating about axis of rotation 19 and the first and second sensors 11, 12 facing the outer circumferential surface 13 of the cam. Here, the radius from the axis 19 to the surface 13 of the cam gradually increases in a clockwise direction over a first circumferential portion 20 of the outer surface and sharply decreases in the clockwise direction over a second circumferential portion 21 of the outer surface. Thus, a counter-clockwise rotation would create decreasing and increasing distance measurements corresponding to the first and second circumferential portions 20, 21, respectively. However, this is not the only possibility, since the rotation can be clockwise. Also, the shape of the cam could also be reversed such that a counter-clockwise rotation would create increasing and decreasing distance measurements corresponding to the first and second circumferential portions 20, 21.

Figure 4:
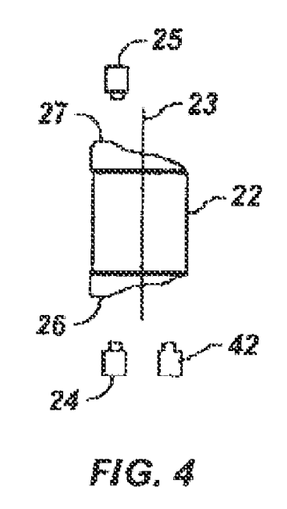
FIG. 4 is a schematic side view of an alternative arrangement of two sensors and a cam with the cam having an alternative shape.

FIG. 4 shows an alternative arrangement with a cam 22 which rotates about axis 23 while sensors 24 and 25 face axial outer surfaces 26 and 27 of the cam 22. While in FIG. 3 the sensors 11, 12 face an outer circumferential surface of the cam 7, in FIG. 4, the sensors 24, 25 face two ends of the cam. Thus, the difference between FIG. 3 and FIG. 4 is whether the sensors face a middle portion of the cam 7 or ends of the cam 22, respectively. Surfaces 26 and 27 have a topography such that the distance between the sensors 24 and 25 and the outer surfaces 26 and 27 vary because the outer surfaces 26 and 27 are not flat. Depending on the angular position of the cam 22, the sensors 24, 25 will determine the distance between sensors 24, 25 and respective portions on the surfaces 26, 27 of the cam 22. Similarly to the situation shown in FIG. 3, depending on the angular position of the cam 22, the surfaces 27 and 26 will, independently, approach or move away from sensors 24 and 25 over a first portion and move away or approach in a second portion. Thus, the configuration in FIG. 3, while being preferred, is not the only configuration to be able to vary the distance between sensors and a surface of a cam since FIG. 4 shows, without limitation, a different configuration. FIG. 4 also shows sensor 42 (in phantom), which can optionally be added in addition to sensors 24 and 25 or used instead of sensor 25. Such configuration of sensors 24, 42 would duplicate sensors 11, 12 but with respect to an axial rather than a radial outer circumferential surface. Because the topography of the cam 22 is known, including the axial outer surfaces 26 and 27, the distance between any of sensors 24, 25, and 42 and facing axial outer surfaces 26 and 27 will provide information regarding the angular position of the cam 22. Additionally, since the positions of the sensors 24, 25, and 42 are fixed relative to the rotation axis 23 of the cam 22, information about the distance between one sensor and the axial outer surfaces 26 or 27 can be used to predict the distance between a different sensor and the facing outer surface 26 or 27.

Figure 5:
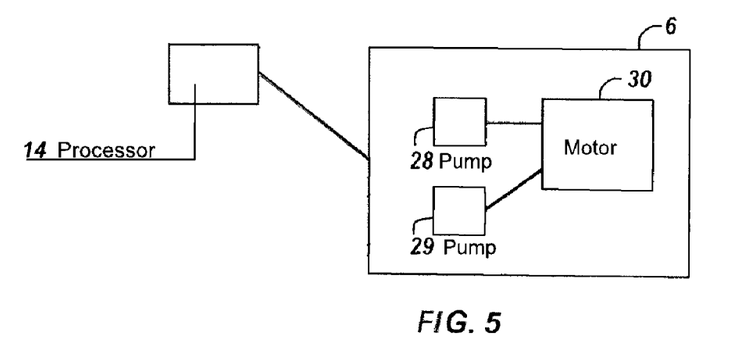
FIG. 5 is a schematic block diagram of a steering mechanism.

As shown in FIG. 5, the processor 14 is operably connected to a hydraulic steering mechanism 6 which is configured to steer based upon the angular position of the steering wheel 5 as instructed by the processor 14. Here, the hydraulic steering mechanism 6 has two pumps 28, 29, and a motor 30, all of which can be controlled by the processor 14 to steer the vehicle 1 pursuant to the angular displacement of the steering wheel 5. However, it is noted that a hydraulic steering mechanism 6 is not the only option. Any vehicle with a steering mechanism can be utilized. The present invention covers a device and method to determine the angular displacement of an object and the direction of rotation of the object and it is not limited by particular steering configurations or types of vehicles even though off-road vehicles with hydraulic steering systems are preferred.

Thus, the present invention is directed to a device for determining the angular displacement of a rotating object, which can be a steering wheel 5, a shaft 10, or a shaft 8 (see FIG. 2). The cam 7 is configured to rotate about an axis at an identical angular speed as the object (e.g., steering wheel 5). Thus, the cam 7 can be connected to shaft 10, shaft 8, or otherwise mechanically connected to steering wheel 5 such that it rotates at the same angular speed as steering wheel 5. It is even possible for the rotation of the cam 7 to correspond to the rotation of the steering wheel 5 without being the same. For example, if there is a gear ratio differential between steering wheel 5 and cam 7, the angular rotation speed of the steering wheel 5 and cam 7 would not be the same, although there would be a correlation between the two.

The processor 14 is operably connected with the first and second sensors 11, 12 and is configured to determine an angular position of the object and a direction of rotation of the object based upon data generated by the first and/or the second sensors 11, 12. Thus, the data can be generated by any one of the sensors or both.

One of the possible shapes of the cam is a spiral shape with a varying outer radius, as shown in FIG. 3. However, any shape that can be used in conjunction with a processor 14 and one, two, three, or more sensors to determine angular position and direction of rotation is within the spirit and scope of the present invention.

It is possible that the variation in length between radii that extend from the axis 19 to different portions of the circumferential outer surface 13 is proportional to the angular distance between such radii. For example, the difference in length between the first radius 31 and the second radius 32 is proportional to an angular distance between the first radius 31 and the second radius 32 (see FIG. 3), the angular distance being defined by arc 17 in FIG. 3. However, this is only one possibility since other shapes of the cam 7 are possible to provide whatever output from the sensors as is mathematically preferable as an input to the processor 14.

Figure 6:
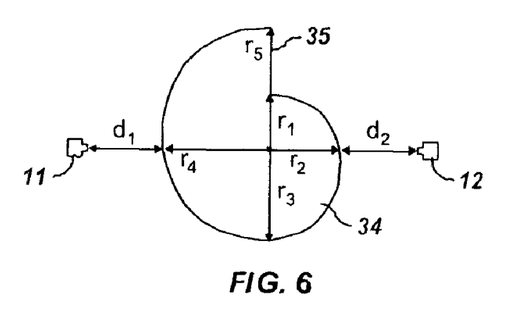
FIG. 6 is a schematic plan view of a cam with a step which defines a line which passes through the axis of rotation of the cam.
Figure 7:
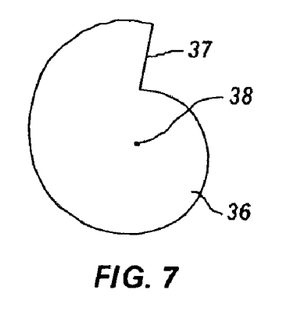
FIG. 7 is a schematic plan view of a cam with a step which defines a line which is angularly offset from a line which passes through the axis of rotation of the cam.

The first circumferential portion 20 extends substantially along 360 degrees around the cam 7 and this is the portion that gradually varies in distance to the sensors 11, 12. Thus, out of 360 degrees possible, the angular extension of this first circumferential portion 20 will take up most of the 360 degrees, and preferably nearly all of the 360 degrees. The second circumferential portion 21, whose distance from the sensors 11, 12, changes rapidly, is minor in angular extent as compared to the first circumferential portion 20. The second circumferential portion 21 can merely define a step 33 in the cam 7, which would mean that the cam 7 has a sharp change in distance to a sensor while rotating and which would mean that the second circumferential portion 21 is much smaller than the first circumferential portion 20. Moreover, the step 33 can be perpendicular to the outer surface 13 of the cam (see FIG. 6), including being exactly radial, or be at a slant relative to the outer surface 13 of the cam (see FIGS. 3 and 7). If the step 33 is perpendicular, then the second circumferential portion 21 is merely a transition point from a high to a low or vice-versa. FIG. 3 shows a cam 7 with one configuration for the step 33, where the step 33 is at a slant. FIG. 6 shows a cam 34 with a different configuration for the step 35, where the step is substantially collinear with the radius $r_1$. FIG. 7 shows a cam 36 with a different configuration for the step 37, where it is at a slant relative to a radius of the cam 36 defined by an axis of rotation 38 of the cam. Cam 36 is similar to cam 7 of FIG. 3, except that the slant of the step 37 is at a different direction relative to the axis of rotation 38 of the cam 36. Thus, the angle of the step relative to the cam can vary. In FIG. 7, step 37 results in a single point of transition for the step 37 in an angular direction since a sensor measuring the distance to the outer circumferential surface of the cam 36 would abruptly measure a change in distance during the transition of the step 37. FIG. 3, in contrast, has a transition that corresponds to the angular extension of arc 18. Preferably, the angular extension of the transition of the steps 33, 37 is either a point or is small relative to the total angular extension of the cam. The slant of the step can have a negative slope as in FIG. 3 or a positive slope as in FIG. 7. Also, the step 33, 37 can have an outer surface which is not linear and the processor 14 can take this into account when calculating angular displacement.

FIG. 6 also shows various radii and distances. For example, $r_1$ is the minimum radius of the cam 34 and $r_5$ is the maximum. As can be seen, $r_1 < r_2 < r_3 < r_4 < r_5$. Additionally, $d_1$ is the distance measured by the first sensor 11 and $d_2$ is the distance measured by the second sensor 12. As r goes up, d goes down, and vice-versa.

The processor 14 is configured to determine a direction of rotation of the object (e.g., steering wheel 5) based upon a distance change between the facing circumferential outer surface of the cam 13 and at least one selected from the group consisting of the first and second sensors 11, 12. Thus, any one sensor is sufficient to provide the direction of rotation and the position of the cam 7 (see FIG. 3). Thus, the invention could only include one sensor, but two are preferred. More than two sensors are also possible. In order to improve the accuracy of the measurements, it is preferred that the first sensor 11 and the second sensor 12 are at an angular separation of at least 60 degrees with respect to the rotational axis 19 of the cam 7. Preferably, the sensors are sufficiently spaced apart so that the readings associated with each sensor are sufficiently different so as to be individually recognizable, even in the presence of some noise. Thus, at least a 60 degree angular separation is preferred between sensors, although it is not required.

It is not uncommon for an operator to turn a steering wheel 5 multiple times in the same direction (i.e., for more than 360 degrees in the same direction) to turn a vehicle. The processor 14 can be configured to count the angular displacement beyond 360 degrees by counting the number of times the cam passes the 360 degree mark. Thus, information regarding the angular displacement of cam 7 would include not only the position of cam 7 but also the total angular displacement that cam 7 has been subject to. The processor 14 can then send commands to the steering system based upon the aggregate rotation of the cam 7 so that the steering would be sharper if the rotation is 1080 degrees as opposed to 720 degrees, for example. Thus, the present system is designed for measurement and steering based upon multiple revolutions of an object such as steering wheel 5.

Also, the processor is configured to recalibrate the determination of the angular position of the object when the second circumferential portion 21 passes the first or second sensors 11, 12. Thus, at the point where there is a sharp change in distance between the cam outer surface 13 and a sensor, this means that the second circumferential portion 21 is facing that sensor. Thus, the processor 14 can be configured to know fairly precisely what the angular position of the cam is, especially if the arc 18<<arc 17. In this situation, a recalibration of the system to determine the angular position of the cam 7 (or the steering wheel 5) can be done. However, the recalibration would not change the "counting" of the number of revolutions since it would just recalibrate the actual position of the cam 7 and would not change the data for the number of times that the steering wheel 5 has been rotated through a full 360 degrees. For example, the effects of thermal drift can be attenuated by such calibration. Although many sensors now have chips inside them that automatically compensate for thermal drift, having a known trigger point will help recalibrate regardless of whether the problem is thermal drift or something else or whether the chip that compensates for the thermal drift is working properly. The zero degree point can be used as the trigger. The minimum and maximum output values for distance will be present here so they can be logged and utilized in a running recalibration/adaptation. The step in the radius is an angular reference point since it always occurs at or near the 0/360 degree mark. Thus, the assumption can be that the position of the step is a zero degree mark, which is returned to every 360 degrees for any sensor. Using the minimum and maximum values around the step in combination with the angular reference of the location of the step and the known profile of the sensor output value in relation to the angle of the cam will permit a determination of the sensor output vs. cam rotational angle relationship. Some kind of filtering and bounds checking could be involved to smooth the progress of learning/adaptation.

Also, once an error is detected in a sensor, future control of the steering mechanism may be based only on the sensor which is functioning, which is why it is preferred to have two sensors. Additionally, when there is a malfunction, the processor 14 can limit the system's operation and can communicate the problem to the operator of the vehicle. For example, if a sensor is malfunctioning, the vehicle could cap the speed and provide a warning to the operator of the vehicle that there is a malfunction with a sensor. Less desirably, the vehicle could also limit the amount of steering that the vehicle can do.

As can be seen in FIG. 3, the first circumferential portion 20 has a much lower change in distance from the rotation axis 19 of the cam 7 as a function of angular position as compared with the second circumferential portion 21. Depending on the steepness of the second circumferential portion 21, it may be the case that measuring the distance from a sensor to the second circumferential portion 21 would provide too much noise or not provide sufficiently accurate measurements. Thus, the processor is configured so that it can determine the angular position of cam 7 and a direction of rotation of the cam 7 based upon data generated by only the first sensor 11 when the second circumferential portion 21 passes the second sensor 12 and by only the second sensor 12 when the second circumferential portion 21 passes the first sensor 11. Thus, processor 14 may treat the reading of the distance to the second circumferential portion 21 as undesirable and disregard it while relying on the reading of the distance to the first circumferential portion 20.

As stated above, one of the advantages of the present invention over the prior art is the robustness of the system since the cam 7 of the present invention is physically more robust than, for example, a disc-shaped device (e.g., a circular disk having a thicker ring surrounding a thinner web with holes through the ring). In order to further improve the reliability of the system, two sensors are used instead of one. The drawings show two sensors being used since this is the preferred embodiment to balance cost and reliability, but one, two, three, or more sensors can be used. When two sensors are used, the sensors are said to be redundant since they provide a backup for one another. In these situations, the processor is configured to compare the outputs of the first sensor 11 and the second sensor 12 to determine whether the first sensor 11 or the second sensor 12 is malfunctioning. This can be done in various ways. If one of the sensors has information that is inconsistent with the way it is expected to operate or has too much noise, this can be a sign that the sensor is having problems. Thus, the data from the sensor that seems to be having problems can be compared with the data of the other sensor to determine whether there is an error. Furthermore, just a comparison between two sensors can provide information as to whether there is a problem with one of them since the readings should be correlated as the two sensors are at a fixed, predetermined, distance apart.

One way to determine whether there is a malfunction in one or more sensors is for the processor 14 or another component to be configured to record a data history obtained from the first sensor 11 and the second sensor 12 and to determine whether the first sensor 11 or the second sensor 12 is malfunctioning based upon the data history. For example, if the data history is consistent and all of a sudden there is a large change or suddenly there is a lot of noise that was not previously present in the data history, this can be utilized to determine whether there is a malfunction in one of the sensors.

The interrelationship of the sensors helps determine errors. For example, the processor may be configured to calculate an expected output value of the second sensor 12 based upon an output of the first sensor 11 and is configured to calculate an expected output value of the first sensor 11 based upon an output of the second sensor 12. With this, the processor 14 can be configured to determine whether the first sensor 11 or the second sensor 12 is malfunctioning based upon a comparison of the expected output value of one of the first and second sensors 11, 12 with the output value of the one sensor. Since the position of the cam 7, the direction of rotation, and the speed of rotation does not vary depending on which sensor does the sensing, the information from one sensor can be utilized to determine what the other sensor should be reading. The fixed angle defined by the two sensors about the axis of rotation 19 creates a fixed relationship between the output values of the two sensors. The topography of the cam 7 is known and data relating to this can be used by the processor to permit the determination of expected values of sensors. If the measured value is different than the expected value by more than a particular range, then this can be an indication that there is an error with a sensor, whether it be the one whose expected value is determined or the sensor which is being utilized to determine the expected value of another sensor. Thus, if the expected output value of a particular sensor and the measured value have an error exceeding an error threshold value, then it is known that there is a problem with one of the sensor values. The error threshold value utilized is dependent on the amount of noise so as to truly reflect an actual error.

Once it is determined that there may be a problem, the time history of each sensor can be analyzed independently to determine what the error is and what sensor is creating the error. For example, if there is a lot of heavy noise on one of the output values, this could be an indication of sensor failure. There can also be minimum and maximum limits set on the output value of a sensor such that if these minimums and maximums are within a valid band, then that means that operation is probably normal. However, if the output value is outside the band defined by the minimum and maximum, then this is an indication that a particular sensor may be faulty.

Figure 8:
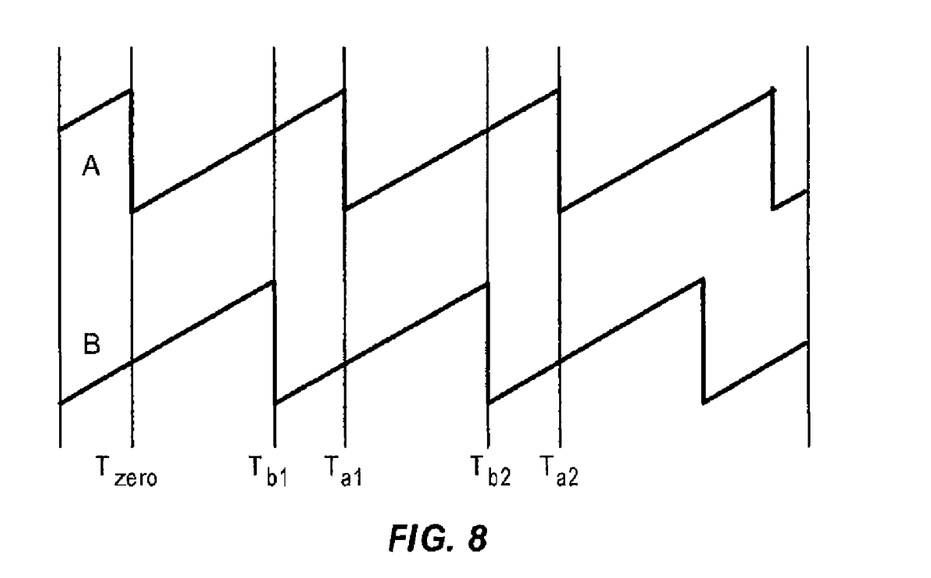
FIG. 8 is a diagram showing a dual channel output for a system with two sensors.
Figure 9:
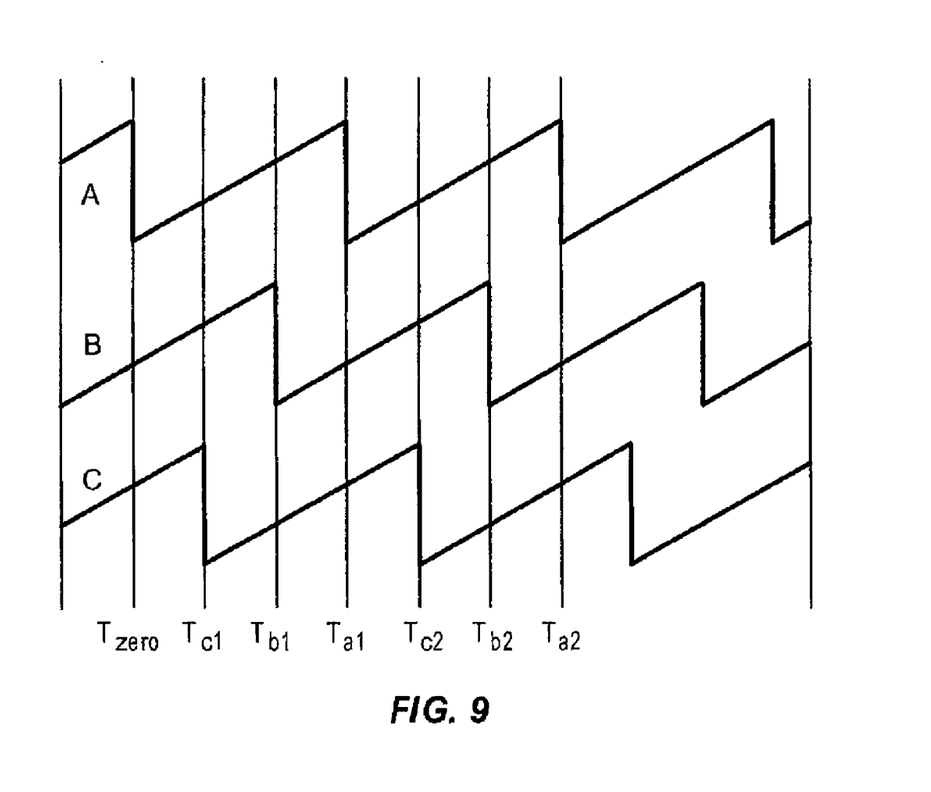
FIG. 9 is a diagram showing a triple channel output for a system with three sensors.

As stated above, the present invention can have one, two, three, or more sensors. FIG. 8 shows the outputs for an embodiment where there are two sensors, one sensor having an output channel A and the other a channel B. At $T_{zero}$ (time=0), the signal from channel A is undergoing a transition from high to low while the signal from channel B is rising. At $T_{b1}$ (time for channel B first transition), the signal from channel B goes through a transition while channel A is rising. At $T_{a1}$ (time for channel A first transition), the signal from channel A is going through a transition and channel B is rising. The pattern continues to $T_{b2}$ (time for channel B second transition) and $T_{a2}$ (time for channel A second transition), etc. FIG. 9 is similar to FIG. 8 except that there is now a third channel, namely, channel C, from a third sensor where, in addition to the designations of FIG. 8, we have $T_{c1}$ (which is time for channel C first transition), and $T_{c2}$ (which is time for channel C second transition).

Figure 10A:
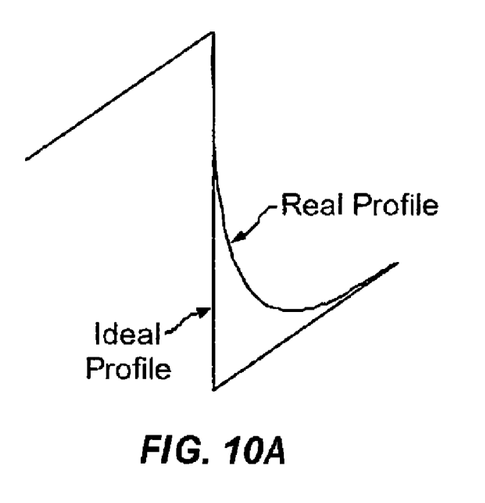
FIGS. 10A and 10B are diagrams showing an ideal profile and a real profile for the channel output of a sensor.
Figure 10B:
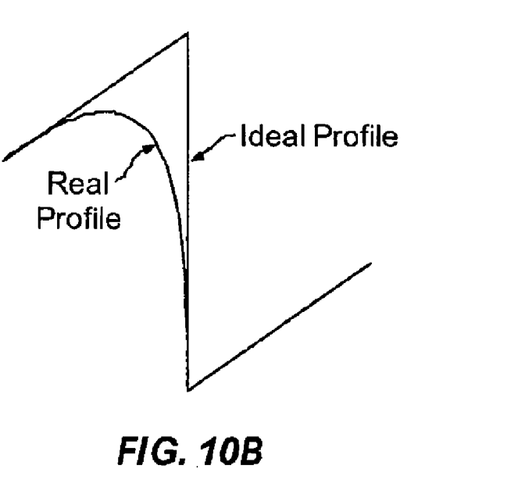

In reality, the sensor output signal will not necessarily be perfect. As shown in FIGS. 10A and 10B, the real profile and the ideal profile of a sensor signal are not necessarily the same at the transition. Some slewing can be present, where, for example, a signal has a sharp change at the transition of region 21. The slewing can be caused by an inability of the sensors to measure distance sufficiently quickly or accurately during the transition. However, the slewing can be experimentally or theoretically predetermined and taken into account during signal processing by processor 14 or even by the signal generation by the sensors themselves. Additionally, the presence of more than one sensor can provide accurate angular position information even if the sensor outputting a slewed signal is temporarily disregarded by the processor 14. This is yet another reason why two sensors are preferably spaced sufficiently far apart in order to avoid having more than one sensor simultaneously undergoing the transition. Also, since the angular extent of the transition is preferably small relative to the full angular extent of the cam 7, the slew of the signal exists only for a relatively small period over a relatively small region.

Figure 11:
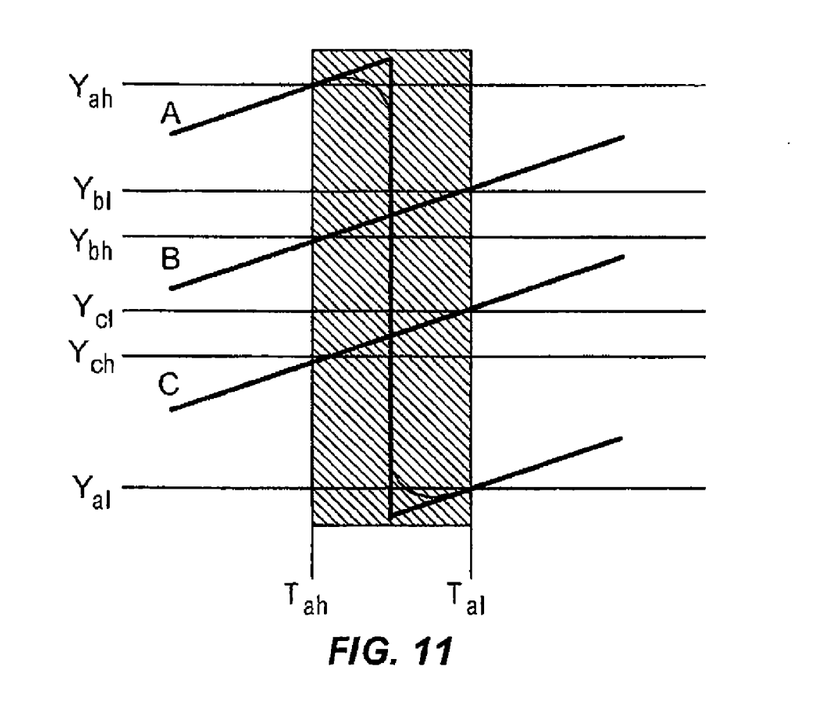
FIG. 11 is a diagram showing the values of three sensors in the transition band of one of the sensors.

There are various ways for the processor 14 to handle the slewing of sensor outputs. One example is shown in FIG. 11, which includes three sensors, producing signals A, B, and C, respectively. The slewing can be accounted for by the processor 14 through the provision of a transition band around the transition portion of the output signal. In FIG. 11, $T_{ah}$ is the beginning of a transition band for sensor A and $T_{a1}$ is the end of the transition band for sensor A. The designations "h" and "1" refer to the points at the beginning and end of the transition band of sensor output signal A, which in FIG. 11 is shown as having a higher output value at the beginning and a lower output value at the end of the transition band. $Y_{ah}$, $Y_{bh}$, and $Y_{ch}$ are the output values for sensor signals A, B, and C, respectively, at time $T_{ah}$. $Y_{a1}$, $Y_{b1}$, and $Y_{c1}$ are the output values for sensor signals A, B, and C, respectively, at time $T_{a1}$. The processor 14 can be programmed to treat as invalid the first sensor output signal A when the output value of that signal exceeds $Y_{ah}$ or falls below $Y_{a1}$ and to use only the output(s) B and/or C of the other sensor(s) until the output of the first sensor returns to the range $Y_{a1} \leq Y_a \leq Y_{ah}$. In practice, the determination of whether output signal A is in transition or not is determined by the output values of sensor signals B and C, and on sensor signal A having an appropriately expected value upon exiting of the transition. Similar analyses apply to output signals B and C. During the actual transition band of first sensor output signal A, which begins at $T_{ah}$, and ends at $T_{a1}$, the processor 14 will treat the first sensor output signal A as invalid and rely on output signal(s) B and/or C to determine angular displacement, regardless of what the value of $Y_a$ is since the transition band has the purpose of excluding information that may be erroneous, such as caused by slewing. However, during the actual transition band, if $Y_a$ is above a maximum or below a minimum, this information can still be utilized as an indication that there may be a problem and that corrective action may be needed.

Figure 12:
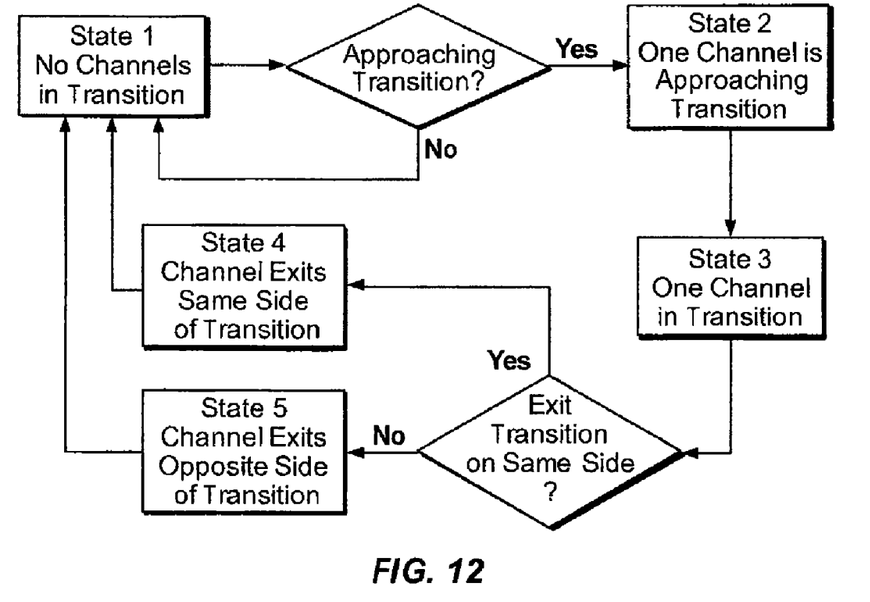
FIG. 12 is a flow diagram showing possibilities for situations of a sensor relative to a transition band.

FIG. 12 is a flow diagram showing what can occur during different situations regarding the transition. Thus, different states are possible depending on whether a particular sensor is approaching a transition or not, whether a channel is in transition, and whether the channel exits the transition on the same side that the transition was entered into or on the opposite side of the side of entry into the transition. The states shown in FIG. 12 are described below.

State 1—Normal Operation

Multiple output signals are monitored and compared against one another for error checking. For example, if sensor output signals are linear, each sensor signal is subtracted from another sensor signal and should be equal to one of two known values. Equation 1 below represents a system where the sensor output signals are linear.

$$Y_a - Y_b = \begin{cases} C_{ab1}; & \text{for } = [T_{zero}, T_{b1}] \\ C_{ab2}; & \text{for } = [T_{b1}, T_{a1}] \end{cases} \quad \text{Equation 1}$$

In Equation 1 above, $Y_a$ is the variable representing the output value of sensor signal A, and $Y_b$ the variable representing the output value of sensor signal B and $C_{ab1}$ and $C_{ab2}$ are the two known values (constants), that represent the difference in output value between $Y_a$ and $Y_b$ for times $T_{zero}$-$T_{b1}$ and for $T_{b1}$-$T_{a1}$ respectively. In FIG. 8, which shows linear sensor output signals, the distance between the output of sensor signal A and sensor signal B is $Y_a$-$Y_b$. As can be seen from FIG. 8, between $T_{zero}$ and $T_{b1}$, this distance is constant, and is referred to as $C_{ab1}$ in Equation 1 above. Analogously, from $T_{b1}$ to $T_{a1}$ this distance is still constant and is referred to as $C_{ab2}$ in Equation 1 above, but it is different from $C_{ab1}$ since the sensor output signal B has undergone a step change but not the sensor output signal A, so the difference in output is different. From $T_{a1}$-$T_{b2}$, $Y_a$-$Y_b$ would be, once again, $C_{ab1}$ since now the sensor output signal A has undergone a step change. This pattern is repeated and results in $Y_a Y_b$ being equal to one of two constants, namely, $C_{ab1}$ and $C_{ab2}$. Thus, if $Y_a$-$Y_b$ is not one of the two constants, then this can be an indication that there is an error in the system. This same idea can be extrapolated to three or more sensors with linear outputs. Since the shape of the cam 7, 22, 34, 36 is predetermined, the point at which normal operation should exist is known based on the angular position of the cam 7,22,34,36, and the point at which a transition is approaching can also this can be determined based upon the angular position of the cam 7, 22, 34, 36.

When output signals are non-linear functions, then $Y_a$-$Y_b$ is not a constant so a different methodology is preferably utilized to indicate potential errors. In this situation, $Y_a$=$F_a$(x) and $Y_b$=$F_b$(x). The variable "x" here can be any variable that will affect the value of Y, such as, for example, time or angular displacement. The functions $F_a$(x) and $F_b$(x) are known in advance. At any point in time, the values for $Y_a$ and $Y_b$ will be measured and therefore known. From the value of $Y_a$, the value of x can be back calculated by using $Y_a$=$F_a$(x). This back calculated value of x can be plugged into $F_b$(x) to determine the supposed corresponding value for channel B, namely, $Y_b$'. Subsequently, $Y_b$' is compared with $Y_b$ and if $Y_b$ is not within an acceptable range of $Y_b$', then this is an indication of a potential error. The reverse calculation is also envisioned, where $Y_b$ is measured and $Y_a$' is calculated and compared with $Y_a$. The determination of $Y_b$' from $Y_a$ and the determination of $Y_a$' from $Y_b$ can be facilitated with look-up tables and interpolation. Since the shape of the cam is known, look-up tables can be prepared and can be utilized along with interpolation to obtain the desired values.

Output signals are also monitored to determine if a transition is approaching, and if it is, then the State 2 is reached. The determination of whether a transition is approaching is based upon the fact that the shape of the cam is known in advance, so the output signals correspond to an angular position of the cam which may be approaching a transition.

State 2—Transition Approaching

It is determined that a transition band is approaching with respect to one sensor, which will be reflected in the channel for that sensor. Whether the transition band is deemed as approaching is based on a threshold value that is applicable before entry into the transition band. During this approach to the transition band, the tolerance for what is deemed a problematic signal is increased. Thus, during normal operation, a change in output for a sensor or an absolute value of the output for a sensor are monitored to determine whether there is a potential error in the measuring system, and a potentially small irregularity can alert the system that there may be an error. Once a transition is deemed as approaching, the change in outputs and the resulting values will not be as predictable or regular and, therefore, the tolerance is increased so as to not alert the system to a potential problem when there is no problem. Thus, in State 2, the processing of errors for the channel which is about to undergo transition is more forgiving than in State 1.

State 3—Channel Transitioning

While one channel is transitioning (or is in the transition deadband, or deadband), it will be ignored. Thus, only output signals for sensors which are not undergoing transition are utilized for the angular measurements of position and direction of rotation. The exclusion begins at the time or angular position when the transition channel enters a deadband (transition band). The deadband can be predetermined and is merely a tolerance for removing a transitioning channel from consideration when it is measuring the step of a cam and will preferably take the slewing into account. Since the system is excluding the signal of the transition channel, the channels that are not in transition are used to determine angular displacement. The channels which are not in the deadband should have output values within a certain range. For example, as is shown in FIG. 11, when channel A is in the deadband, the following values for $Y_b$ and $Y_c$ are present.

$$Y_b = [Y_{bh}, Y_{b1}]$$

$$Y_c = [Y_{ch}, Y_{c1}]$$

Thus, the output for sensor B, namely, $Y_b$, should range from $Y_{bh}$ and $Y_{b1}$ during the deadband for sensor A and the output for sensor C, namely, $Y_c$, should range from $Y_{ch}$ to $Y_{c1}$ during the deadband for sensor A. Once $Y_b \leq Y_{bh}$ or $Y_b \geq Y_{b1}$, this means that sensor A is at the edge of the deadband for sensor A or is outside of the deadband for sensor A. Thus, sensors B and C can be utilized to determine whether sensor A is in or out of the deadband. This same features are also applicable to sensors B and C when they are transitioning. Thus, one or more sensors that are not transitioning can be used to provide information not only on the angular position and displacement of the cam, but also on the status of other sensors. Thus, the sensors that are not transitioning are utilized to detect the presence of a transition band for a channel undergoing transition.

State 4—Exits Transition on Same Side

There is a determination on which side of the deadband the sensor A exits relative to the side from which it entered. If the exit of the deadband is done on the same side as where the entrance to the deadband occurred, then there is no incrementation or decrementation of the rotational index. Thus, this means that a full 360 degree rotation did not take place so there is no counting of a full rotation having taken place. Thus, if the steering wheel 5 is moved in one direction such that channel A is in the deadband and then the steering wheel 5 is moved back in the other direction, channel A wound enter and exit the deadband on the same side and no full 360 degree rotation would be counted.

State 5—Exits Transition on Opposite Side.

Analogously to State 4 above, the exit from the deadband for the particular sensor, such as sensor A, is on the opposite side of the deadband from where the entry occurred. In this case, the full 360 degree rotation is counted and there is an increment/decrement of the rotational index, depending on which direction the rotation is taking place since the counting may be a full 360 degrees clockwise or counter-clockwise.

Regarding sensor failure modes, there are many that can occur and which can be monitored for. Five failure modes are explained below that can be detected by the present invention. However, additional failure modes can be included and detected as can be determined by one of ordinary skill in the art. In the description of the sensor failure modes below, Y is the output value of a respective sensor.

1. One channel shorts to ground and the following situation is obtained.

$(Y_{sig}=0)<Y_{min}$

This means that the value of a signal ($Y_{sig}$) is zero, which is less than a minimum value ($Y_{min}$) that is acceptable, so this demonstrates that there is some kind of malfunction in the sensor where the value is zero.

2. One channel shorts to power supply and the following situation is obtained.

$(Y_{sig}=V_+)>Y_{max}$

This means that the value of a signal ($Y_{sig}$) is the same as the power supply, which is more than a maximum value ($Y_{max}$) that is acceptable, so this demonstrates that there is some kind of malfunction in the sensor where the value is the same as the power supply.

3. One channel holds a constant valid value and the following situation is obtained.

$Y_{min} \leq (Y_{sig}=\text{const}) \leq Y_{max}$

Thus, although the value of the signal ($Y_{sig}$) is within an acceptable range the same or above a minimum ($Y_{min}$) or the same or below a maximum ($Y_{max}$), having a constant value may reflect a problem in the system if the steering wheel 5 is being turned. Thus, this means that the sensor with the constant value is malfunctioning.

4. One channel has an intermittent connection (rapid changes of output value for short periods of time at random time intervals). In this case, such sensor can be deemed to be malfunctioning.

5. The relative profile between two channel outputs changes and is outside of accepted values. Since the profile of the cam 7, 22, 34, 36 is known, profiles of sensor outputs can be compared with one another in terms of actual measurement and in terms of what the measurement should be, and if there is a divergence between the two, then this indicates the presence of a potential problem. Thus, if the output for sensor A has profile A and the output for sensor B has profile B, the difference between the two profiles as a function of time can be measured and can also be calculated based on the known profile of the cam 7, 22, 34, 36 and the position of the sensors A and B, and potentially C. If there is an unacceptable change in this difference, this may signal an error in the system.

Below are examples of errors that can occur and which sensor failure mode above would fall under this error, as follows:

if ($Y_{sig}<Y_{min}$) then the output of the sensor is below a minimum and there is some kind of error occurring. Failure mode 1 would fall under this category.

if ($Y_{sig}>Y_{max}$) then the output of the sensor is above a maximum and there is some kind of error occurring. Failure mode 2 would fall under this category.

if ($|F(Y_{sig1})-F(Y_{sig2})|>\text{error}_{max}$) then the relationship between two sensor outputs, $Y_{sig1}$ being the output of one sensor and $Y_{sig2}$ being the output of a different sensor, is beyond a maximum error so there is some kind of error occurring. Failure mode 3 would fall under this category, since a constant value for one sensor would make its relationship with another sensor eventually fall outside of the maximum error. Failure modes 4 or 5 may fall under this category as well.

$$\text{if } \left(\frac{DY_{sig}}{DT} > \left(\frac{DY}{DT}\right)_{max}\right)$$

then the change in the output value of a sensor is changing faster than a maximum rate of change so there is some kind of error occurring. Failure mode 4 may fall under this category. It should be noted that checks for changes in output value that are too high would not occur for a sensor in transition since the transition could mean rapid changes in output without there actually being an error.

Figure 13:
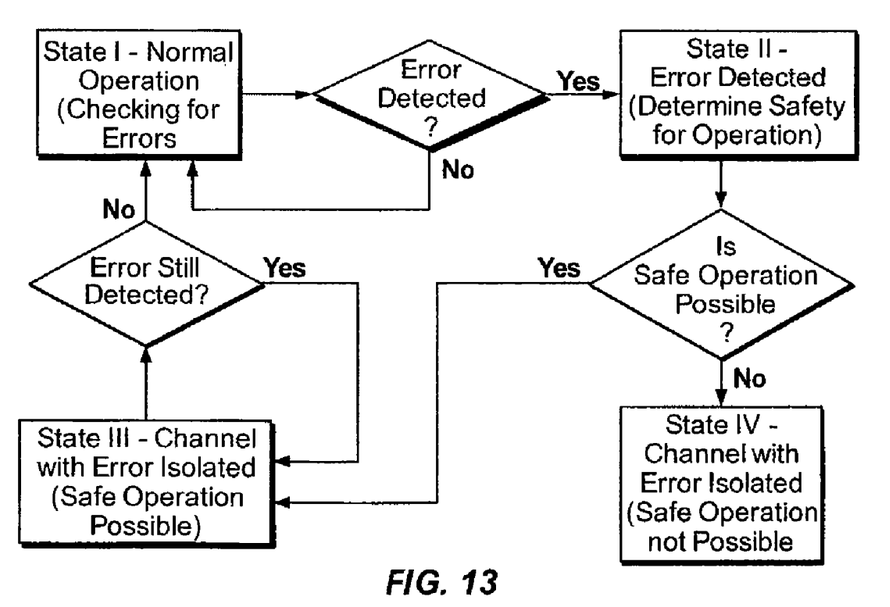
FIG. 13 is a flow diagram showing possibilities for error checking of a sensor.

FIG. 13 is a flow diagram showing what occurs when there are errors found or not found. For example, in State I, this means normal operation which occurs when there are no errors detected. If an error is detected, then the system will be in State II and it will be determined whether or not it is safe to continue operation. If it is determined that it is not safe to continue operation, then State IV is reached where the channel with the error is isolated. At this point, the system will determine, based upon predetermined commands, what is to be done considering that safe operation is not possible. It could limit the speed of the vehicle, limit the turning, give a warning to the operator, shut off the throttle of the vehicle, etc. If in State II it is determined that safe operation is possible, then the system goes to State III, where the channel with the error is isolated. At this point the system can determine to only use a sensor which is not malfunctioning or may give a warning that safe operation is possible but that one sensor is not properly working. The system can also limit the speed of the vehicle or limit the turning amount of the vehicle. If the error continues to be detected, then State III remains. If the error is no longer detected, then State I is reached again where operation is normal and the system is checking for errors without any errors being detected.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An off-road work vehicle with a steer-by-wire steering system comprising a device for determining the angular displacement of a steering wheel, the device comprising:
 a cam configured to rotate about an axis at an identical angular speed as the steering wheel;
 a first sensor proximal to a facing outer surface of the cam and being configured to determine a distance between the first sensor and the facing outer surface of the cam;
 a second sensor proximal to a facing outer surface of the cam and being configured to determine a distance between the second sensor and the facing outer surface of the cam; and
 a processor operably connected with the first and second sensors and configured to determine an angular position of the steering wheel and a direction of rotation of the steering wheel based upon data generated by the first and/or the second sensor,
   wherein the distance between each of the first and second sensors and the facing outer surface of the cam changes gradually over a first major portion of the facing outer surface and sharply over a second, minor portion of the facing outer surface; and
   wherein the processor is operably connected to a hydraulic steering mechanism configured to steer based ipon the angular position of the steering wheel, the processor and sensors configured to count angular displacement of the cam beyond 360 degrees by counting a number of times the cam passes the 360 degree mark such that the angular displacement includes a position of cam and total angular displacement of the cam and the processor is configured to send commands to the steering system incorporating the total angular displacement of the cam.

2. The off-road work vehicle according to claim 1, wherein the processor is configured such that a higher detected aggregate number of degrees rotated corresponds to a shaper steering command.

3. The off-road work vehicle according to claim 1, wherein the processor is configured to determine the angular position of the object and a direction of rotation of the object based upon data generated by only the first sensor when the second portion passes the second sensor and by only the second sensor when the second portion passes the first sensor.

4. Device for determining the angular displacement of a rotating object, comprising:
   a cam configured to rotate about an axis at an identical angular speed as the object;
   a first sensor proximal to a facing outer surface of the cam and being configured to determine a distance between the first sensor and the facing outer surface of the cam;
   a second sensor proximal to the facing outer surface of the cam and being configured to determine a distance between the second sensor and the facing outer surface of the cam; and
   a processor operably connected with the first and second sensors and configured to determine an angular position of the object and a direction of rotation of the object based upon data generated by the first and/or the second sensor,
   wherein the distance between the facing outer surface of the cam and each of the first and second sensors in a first rotational direction of the cam changes gradually over a first portion of the outer surface and sharply reverses over a second portion of the outer surface; and
   wherein the processor is configured to determine the angular position of the object and a direction of rotation of the object based upon data generated by only the first sensor when the second portion passes the second sensor and by only the second sensor when the second portion passes the first sensor.

5. The device according to claim 4, wherein the facing outer surface of the cam is a facing circumferential outer surface of the cam, the first portion is a first circumferential portion, the second portion is a second circumferential portion, and the facing circumferential outer surface of the cam has a radius from the axis which gradually increases in the first rotational direction over the first circumferential portion of the outer surface and sharply decreases in the first rotational direction over the second circumferential portion of the outer surface.

6. The device according to claim 5, wherein the cam has a spiral shape with a varying outer radius.

7. The device according to claim 5, wherein the circumferential outer surface has a first radius and a second radius and the circumferential variation in radii of the cam between the first radius and the second radius is proportional to an angular distance between the first radius and the second radius.

8. The device according to claim 5, wherein the first circumferential portion extends substantially along 360 degrees around the cam.

9. The device according to claim 5, wherein the processor is configured to determine a direction of rotation of the object based upon a distance change between the facing circumferential outer surface of the cam and at least one selected from the group consisting of the first and second sensors.

10. The device according to claim 5, wherein the first sensor and the second sensor are at an angular separation of at least 60 degrees with respect to the axis.

11. The device according to claim 4, wherein the first and second sensors are configured to determine respective distances between the first and second sensors and the facing outer surface of the cam by a use of optical sensing or ultrasonic sensing.

12. A steering system comprising the device according to claim 4.

13. The steering system according to claim 12, wherein the steering system is a steer-by-wire system.

14. The steering system according to claim 13, wherein the object is a shaft, and the steering system further comprises a steering control device rotationally engaged to the shaft.

15. The steering system according to claim 14, wherein the processor is operably connected to a steering device and wherein the steering device is configured to steer based upon the angular position of the object.

16. Device for determining the angular displacement of a rotating object, comprising:
   a cam configured to rotate about an axis at an identical angular speed as the object;
   a first sensor proximal to a facing outer surface of the cam and being configured to determine a distance between the first sensor and the facing outer surface of the cam;
   a second sensor proximal to the facing outer surface of the cam and being configured to determine a distance between the second sensor and the facing outer surface of the cam; and
   a processor operably connected with the first and second sensors and configured to determine an angular position of the object and a direction of rotation of the object based upon data generated by the first and/or the second sensor,
   wherein the distance between the facing outer surface of the cam and each of the first and second sensors in a first rotational direction of the cam changes gradually over a first portion of the outer surface and sharply reverses over a second portion of the outer surface; and
   wherein the processor is configured to recalibrate the determination of the angular position of the object when the second portion passes the first or second sensor.

17. Device for determining the angular displacement of a rotating object, comprising:
   a cam configured to rotate about an acis at an identical angular speed as the object;
   a first sensor proximal to a facing outer surface of the cam and being configured to determine a distance between the first sensor and the facing outer surface of the cam;
   a second sensor proximal to the facing outer surface of the cam and being configured to determine a distance between the second sensor and the facing outer surface of the cam; and a processor operably connected with the first and second sensors and configured to determine an angular position of the object and a direction of rotation of the object based upon data generated by the first and/or the second sensor, wherein the distance between the facing outer surface of the cam and each of the first and second sensors in a first rotational direction of the cam changes gradually over a first portion of the outer surface and sharply reverses over a second portion of the outer surface; and wherein the processor is configured to compare the outputs of the first sensor and the second sensor to determine whether the first sensor or the second sensor is malfunctioning.

18. The device according to claim 17, wherein the device is configured to record a data history obtained from the first sensor and the second sensor and to determine whether the first sensor or the second sensor is malfunctioning based upon the data history.

19. The device according to claim 17, wherein the processor is configured to calculate an expected value of the second sensor based upon an output of the first sensor and is configured to calculate an expected value of the first sensor based upon an output of the second sensor and wherein the processor is configured to determine whether the first sensor or the second sensor is malfunctioning based upon a comparison of the expected value of one of the first and second sensors with the output value of the one sensor.

* * * * *